Feb. 11, 1936.  L. C. HUCK  2,030,166
RIVET AND METHOD OF SETTING THE SAME
Filed March 31, 1932  2 Sheets-Sheet 1
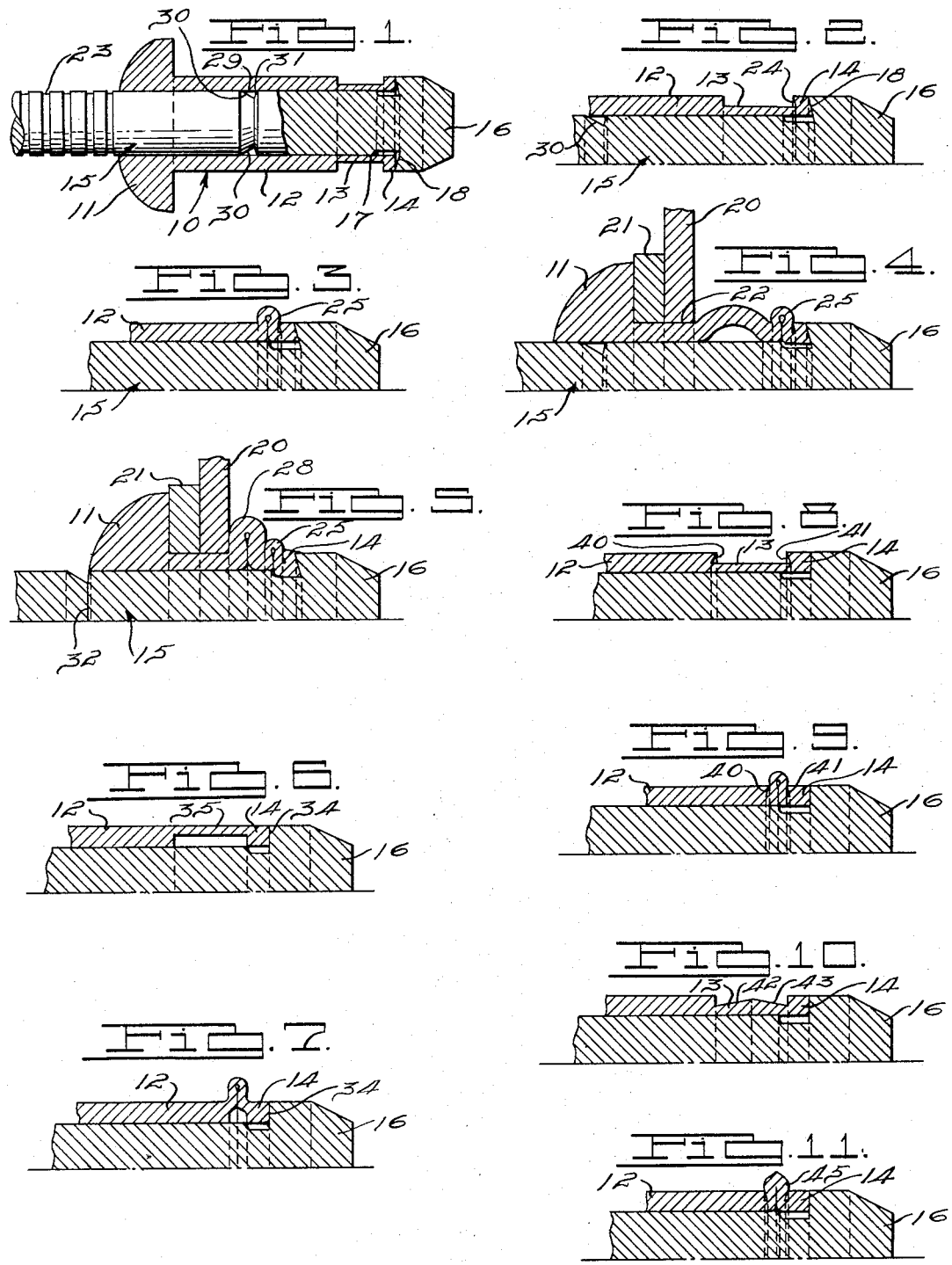
INVENTOR
Louis C. Huck.
BY
ATTORNEYS Feb. 11, 1936.   L. C. HUCK   2,030,166
RIVET AND METHOD OF SETTING THE SAME
Filed March 31, 1932   2 Sheets-Sheet 2
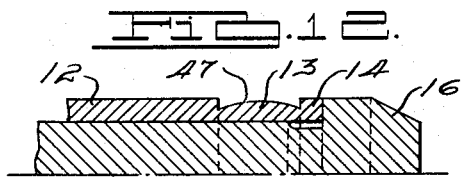
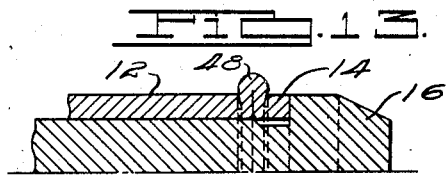
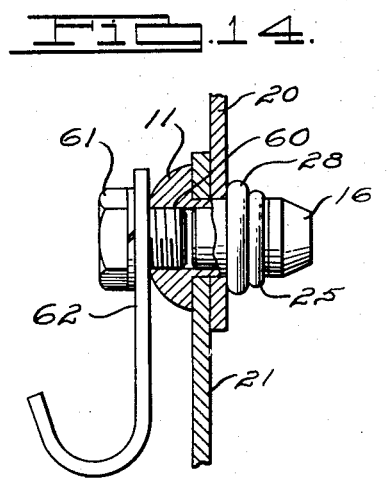
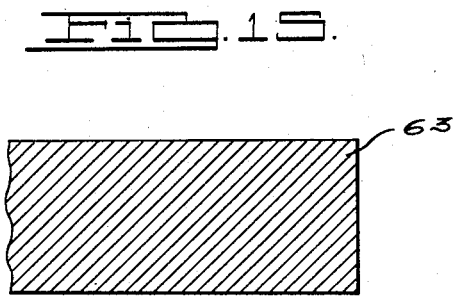
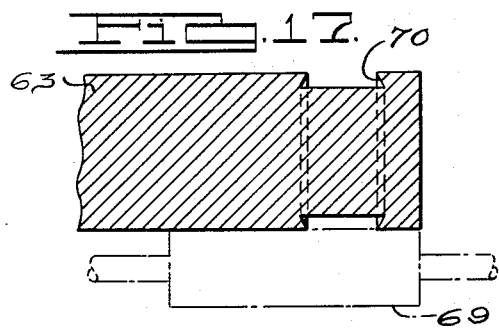
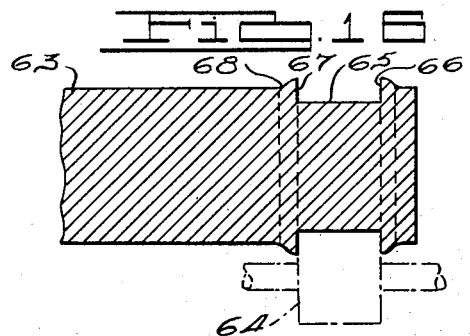
INVENTOR
Louis C. Huck.
BY
Harness Dickey Pierce & Hanna
ATTORNEYS.

Patented Feb. 11, 1936

2,030,166

UNITED STATES PATENT OFFICE 2,030,166

RIVET AND METHOD OF SETTING THE SAME

Louis C. Huck, Grosse Pointe, Mich., assignor to Huxon Holding Corporation, Detroit, Mich., a corporation of Michigan Application March 31, 1932, Serial No. 602,170

REISSUED

32 Claims. (Cl. 218—29)

The invention relates to rivets and it has particular relation to a rivet construction, method of riveting and method of making the rivet.

Particularly the invention is related to my co-pending application for patent, Serial No. 599,868, filed March 19, 1932, although it is also related in certain respects to applications for patent enumerated in the latter.

In the above identified application for patent, Serial No. 599,868, a rivet is disclosed which comprises a tubular female member adapted to project through openings ordinarily having slight clearance therefor, in a structure to be riveted, and a male member extending through the female member which has a head at one end engaging that end of the female member first inserted in the structural openings. The rivet is particularly useful for inserting and riveting constructions from one side only, and the maximum diameter of that part of the female member passing into or through the openings, cannot be larger than the diameter of the latter. Preferably the end of the female member at the side of the structure from which the insertion is made or the working side, will have a head initially formed although it may be formed in the rivet setting operation, which engages such working side of the structure. After the rivet is thus inserted, the gripping end of the male member is pulled, and the reactionary force is applied to the adjacent end or head of the female member, during which operation, a bulb head is formed from the female member against the inner side of the structure.

For reinforcing that end of the female member adjacent the male member head, and increasing its bursting strength, a construction was disclosed in such application for patent which provided for the formation of a bulb out of an annular wall portion of the female member, during the initial stages of the rivet setting operation, and this bulb head served to then prevent bursting or entering of the male member head into the adjacent end of the female member. For forming such bulb, that end of the female member had a portion of reduced wall thickness, between the main body of the female member and a collar thereon immediately adjacent the male member head. Following the formation of the bulb, continued pull on the male member caused, through the head on the latter, the collar and such bulb, bulbing of the main body portion of the female member, to provide a bulb against the inner side of the structure. This brief description, of course, is illustrative only generally of the particular construction set forth in such application for patent.

In general the objects of the present invention are similar to those set forth in such copending application for patent.

More particularly, an object of the invention is to provide improved means for applying stress to that part of the female member to be bulbed, in such manner that the outer fibers of such member are stressed more than the inner fibers.

Another object of the invention is to provide improved means for applying the stress to the female member in a direction longitudinally thereof, and slightly towards its axis.

Another object of the invention is to obtain the above mentioned stress applications in a rivet of the double bulbing type as described previously.

Another object of the invention is to provide a rivet of the general type indicated, which may readily be employed for supporting various articles on the structure riveted.

Another object of the invention is to obtain improvements which provide for the initial formation of a reinforcing bulb, to increase the bursting strength of an end of the female member, prior to forming the main bulb head.

Another object of the invention is to provide improvements in the method of bulbing the rivet so that bulbing may be controlled for effecting a tightly riveted construction.

Another object of the invention is to provide a method of manufacturing a female member with an undercut groove therein, which will be simple and inexpensive.

Other objects of the invention will be apparent from the following description taken in conjunction with the drawings, and the claims hereinafter set forth.

For a better understanding of the invention reference may be had to the accompanying drawings, forming a part of the specification wherein:

Figure 1 is a longitudinal cross-sectional view illustrating a rivet assembly constructed according to one form of the invention, prior to application of the rivet for securing structural elements together;

Figures 2, 3, 4 and 5 illustrate respectively progressive steps involved in the application of the rivet shown by Figure 1, for connecting such structural elements;

Figures 6 and 7 illustrate fragmentarily, a different form of rivet assembly, and the manner in which the first head of the multiple head on the female rivet member is formed and the manner in which it then cooperates with the remainder of the assembly;

Figures 8 and 9 similarly, fragmentarily illustrate a rivet assembly constructed according to another form of the invention, and the manner in which the first head of the multiple head formation on the female member is obtained;

Figures 10 and 11 similarly illustrate a rivet assembly constructed according to another form of the invention, and the manner in which the first head of the multiple head is formed;

Figures 12 and 13 illustrate a rivet assembly, constructed according to still another form of the invention, and the manner in which the first of the heads on the female member is obtained;

Figure 14 is a cross-sectional view of a rivet which has been applied to secure structural elements together in which the female member may be employed for supporting various articles;

Figures 15, 16 and 17 illustrate steps which may be involved in manufacturing a female rivet member such as that illustrated in Figure 8.

According to one form of the invention, a female member 10, as shown by Figure 1, is provided which is of tubular character, and is provided with a head 11 at one end. At the inner side of the head 11 the female member has an annular, continuous wall body portion 12 substantially of uniform inner and outer diameter throughout its length and this body portion at its end remote with respect to the head 11, is integral with a smaller annular, and continuous tubular portion 13 having substantially the same inner diameter, but a smaller outer diameter. At the outer end of the portion 13, an annular tubular collar or head 14 is provided and the inner and outer diameters of this collar preferably substantially correspond to the inner and outer diameters of the body portion 12. The female member so described, is adapted to cooperate with a male shank member 15, extending through the female member and beyond the head 11 on the latter, and which has a head 16 substantially equal in outer diameter to that of the collar 14, engaging the end face of the collar. As initially assembled, it is preferred to have the outer diameter at least of the main body portion of the male member, substantially corresponding to the inner diameter of the body portion 12 so that at least a fit will be effected which will retain the parts assembled, although a press fit is preferable. Adjacent the head 16, the male member is provided with an annular groove 17, although one or more circumferentially separated recesses may be employed in lieu of a groove, and such groove is located generally under the collar 14 as the purpose thereof is to allow the metal of the female member to flow inwardly thereinto during the rivet setting operation to positively lock the male and female members together after the rivet is set. The face of the head 16 adjacent the groove 17 is undercut at a slight angle as indicated at 18 and this angle, for example, may be 85 degrees with respect to the longitudinal axis of the male member. In this connection it is desired to point out that the end face of the collar 14 in this construction, substantially defines a radial plane and it will follow that the end face 18 of the head 16 therefore will initially engage the end face of the collar 14 only along the outer margin of the latter. It might be added, however, that the face 18 may be substantially radial and the end face of the collar beveled at substantially the aforementioned angle of 85°, but oppositely to the bevel 18 shown. This arrangement would also cause initial engagement of the head and end face of the collar only along the outer margin of the latter.

In the application of a rivet of this character, structural elements such as indicated at 20 and 21 to be riveted together are first provided with openings 22 substantially corresponding in diameter to the outer diameter of the body portion 12 of the female member although a slight clearance usually will be present and the outer diameter of the body portion 12, collar 14, and the head 16 are such that these parts may be inserted through the openings 22, from one side of the structure, as for example, from that side outside of the element 21, until the head 11 abuts the structural element last mentioned. In setting the rivet it is to be understood that a suitable device or machine is employed for pulling the projecting end of the male member while applying an equal or greater force against the head 11 of the female member to hold it against the structural element 21. A machine which may be used for this purpose is disclosed in the application for patent of Louis C. Huck and Ralph A. Miller, Serial No. 560,289, filed August 31, 1931, and comprises movable jaws for gripping the projecting end of the male member while applying the reactionary force when the male member is pulled by the jaws, against the head 11 of the female member. At this time it is desired to point out that the projecting end of the male member, preferably may be threaded or provided with a plurality of shallow grooves 23 to facilitate obtaining greater gripping action between the jaws of the aforementioned machine and the male member and the jaws will preferably have complementary threads or ribs for cooperating with the threads or grooves on the male member.

In the rivet described, the collar 14 has such axial length and resistance to axial deformation, compared to the resistance of the portion 13 of the female member to deformation, that in the initial pulling of the male member, the collar is axially deformed until it substantially fits the undercut 18 on the head 16 of the male member before the portion 13 of the female member is completely bulbed. Initial deformation of the collar before bulbing begins is illustrated in Figure 2, and it will be noted that as the collar so takes the form of the undercut 18, its opposite face at the outer end of the portion 13 takes a bevel as indicated at 24 substantially parallel to the undercut. Now as the male member continues to move, the weaker portion 13 of the female member begins to bulb outwardly and finally assumes substantially the shape shown in Figure 3 as indicated at 25. It should now be apparent that this bulbed head constitutes a reinforcement at the end of the portion 12 of the female member which will greatly facilitate bulbing the latter and prevent bursting or flaring of the female member end, when the greater force which is necessary to bulb part 12 is applied. It may be pointed out here that the shoulder at either end of the reduced portion 13 initially substantially defines a radial plane and substantially sharp corners are provided at the end of such portion although it will be appreciated that when the collar 14 is deformed as shown in Figure 2, the shoulder thereon will become beveled as previously indicated. Now as the head 25 is formed as shown by Figure 3, it will substantially engage the shoulder at the end of the portion 12 of the female member, along a radial plane area while the opposite side of the bulbed head will engage the shoulder on the collar 14, the latter being beveled, only along the outer margin of the beveled portion of said collar. Consequently, any further movement of the male member acting through the head 16 and the collar 14 will cause a greater force to be exerted along the outer margin of the collar and the line of engagement of the collar with the head 25. Acting through the head 25, this greater stress will be transmitted to the outer fibers of the end of the body portion 12. Owing to the angle of the shoulder on the collar 14 the force will be directed not only axially of the body portion but also toward the axis of the rivet. Either or both stress application features seemingly is instrumental in effecting location of the line of greatest diameter of the bulbing portion 12, nearer to the structure being riveted, than to the inner end of such portion 12, although such line may be substantially at the midway point. Preferably portion 12 bulbs in globular fashion, as shown in Figure 4, in which an axial cross section shows the portion substantially of uniform curvature. The head 28 thus formed is tight against the structure, and the manner of bulbing insures drawing of the plates together.

At this time it is desired to call attention to the fact that the male member preferably is provided with a neck 29 intermediate its ends, defined by a beveled surface 30 and a rounded surface 31, the latter surface having substantially the same contour as the outer surface of head 11 on the female member adjacent the opening therein. This neck on the male member is preferably so located that following the rivet setting operation the bevel 31 is substantially flush with the outer surface of the female head 11. Continued pull on the male member will so tension it that it will break at the neck 29, since this is the weakest part of the male member, and as a result of the break, as indicated at 32 in Figure 5, the broken end of the male member will constitute substantially a continuation and flush portion of the female head 11.

In such copending application for patent exemplary metals and dimensions of the male and female members, were set forth and it should be understood that the metals and dimensions of the male and female members may be of the same character in this invention. As set forth in such co-pending application, the dimensional relation of the parts in any size of rivet may vary appreciably without obtaining undesirable results, and this variation may depend to some extent for example upon the metals employed. In general, the inner diameter of the body 12 will be within the range of 68% to 83% of the outer diameter thereof, the outer diameter of the reduced part 13 within the range of 80% to 95% of the outer diameter of body 12, and the length of the part 13 within the range of 30% to 75% of the outer diameter of the body 12. The length of collar 14 in the present case will be less than in such co-pending case, as for example, ⅛th of the length of part 13, so that the collar may, prior to complete bulbing of head 25, deform to fit the undercut or bevel 18 on the head. It will be understood that during or after bulbing, metal in the female member, adjacent the collar 14, flows into the groove 18, to lock the parts together after the rivet is set.

In the construction shown by Figures 6 and 7, the female member 10, at the end of the body 12 opposite the head 11, has a portion 35 of reduced wall thickness, but in contrast to the portion 13, in Figure 1, portion 35 has its inner diameter enlarged and its outer diameter substantially the same as that of body 12. The length and wall thickness of portion 35 may be the same as that of portion 13, with respect to the outer diameter of body 12, but the collar 14 shown in Figure 6, preferably is longer than the collar in Figure 1. The portion 35 bulbs substantially as shown in Figure 7, and the body 12 will then bulb substantially as shown in Figure 4, to provide a head 28 as shown in Figure 5. The metal in the collar 14, during the riveting operation, likewise will flow into the groove 17, to lock the parts together. In this construction the outer fibers of the female member will be stressed to a greater extent than the inner fibers.

The rivet assembly shown by Figures 8 and 9 obtains a similar result to that of Figure 1, but in a different way. In this construction the female member is provided with a portion 13 in which the walls at the end thereof indicated at 40 and 41 are both undercut although it might be desirable to undercut only one wall. As the portion 13 bulbs, as shown by Figure 9, it is apparent that one or both of these undercut portions 40 and 41 will cause the application of greater forces to the outer fibers of the body portion 12 for substantially the same reasons pointed out previously as it will be apparent that such undercut portions along their outer margins will engage the bulb and hence the outer fibers of the body portion 12 will be stressed to a greater extent than the inner fibers.

A similar result is obtained in the assembly shown by Figures 10 and 11. In this construction, the portion 13 of the female member has outer wall surfaces 43 and 42 slightly converging outwardly toward the center line and when this portion is bulbed as shown by Figure 11, it is apparent that the bulb formed as shown at 45 will be of such character that the collar 14 acting through the bulb will still apply a greater force to the outer fibers in the body portion 12.

The construction shown by Figures 12 and 13 is similar to that shown by Figures 10 and 11 with the exception that the portion 13 has an arcuate outer surface indicated at 47 with the thicker portion midway between the ends thereof. After the first bulb is formed, as indicated at 48 in Figure 13, the collar 14 will stress the outer fibers of the portion 12 to a greater extent than the inner fibers.

All of the rivet assemblies described and shown in the previous description, relate to the formation of a first bulbed reinforcing head, which is then instrumental in forming a second and stronger bulbed head. In each case this is effected by an arrangement which preferably stresses the outer fibers first, as it seems that bulbing of the second head is very satisfactorily obtained in this manner. Moreover, in at least the construction shown by Figure 1, the force of the male head 16 is transmitted through the first bulbed head to the portion 12 of the female member in an axially inclined direction toward the axis of the rivet. It should be apparent that in any of the constructions the beveled face on the head 16 of the male member may be employed, and also that one or both undercuts as shown in Figure 8 in the female member, might also be employed if found desirable. Moreover, it is entirely possible to use the collar 14 shown by Figure 2 which initially takes the form of a beveled head on the male member in any of the constructions as apparently any initially formed bevel of this character in the female member or bevel formed during the initial movement of the male member would help to obtain the result of greater stressing of the outer fibers of the portion 12 of the female member and hence bulbing as described. In any of the rivets, the male and female members are locked mechanically in a positive manner against relative axial movement after the rivet is set. As more particularly described in my copending application for patent, in setting the rivet, the female member may be enlarged to fill up any interstices between it and the openings in the structural elements, and that similarly this may increase any press fit or effect a press fit between the male and female members so that a final tight fit is obtained between the parts.

The construction shown by Figure 14 may be a modification of any of the constructions previously described and in this case the male member will be broken off inwardly of the outer surface of the head 11 on the female member. Either during the manufacture of the female member or afterwards, the remaining opening in the head 11 indicated at 60 may be threaded. This threaded opening may be utilized as a means for supporting articles on the rivets and as shown, a machine bolt 61 may be threaded into the head and against a hook 62 for example, so that various articles may be supported on the structure by means of the rivet. It is manifest that utilization of the rivet in this manner would not substantially affect its utility for connecting structural elements together.

Figures 15, 16 and 17 are illustrative of a method of manufacturing the female member shown by Figure 8. As shown by Figure 15, the female member initially may be solid as indicated at 63 and then by means of rollers indicated at 64 in Figure 16, a groove 65 may be formed in the end portion of the female member defined at its ends by plane radial faces 66 and 67. Normally, during such formation of a groove, portions of the member at opposite ends of the groove will be bulged outwardly as indicated at 68. Now, by applying other rollers indicated at 69 in Figure 17, such bulged out portions 68 may again be brought into alignment with the outer surface of the member and during this formation the groove 65 will be defined by end faces having bevels indicated at 70. After the groove 65 is thus formed the member may be drilled to provide a tubular construction as shown by Figure 8.

It may also be stated that preferably the female member is composed of metal more ductile than the male member. Examples of various combinations of metals that may be used have already been disclosed in my previously identified copending applications for patent.

From the above description it is apparent that a rivet has been provided particularly in which a plurality of heads are formed on the female member by pulling a male member therethrough and applying the reactionary force of the pull to the head at the other end of the female member. The important function of the first bulb head formed at the inner end of the female member is to provide a flange to increase the bursting strength of this tubular end of the female member. Moreover it will be seen that constructions have been provided for the application of pressure toward and at an angle to the rivet axis, and constructions have been provided for stressing the outer fibers of the metal female member to a greater extent than on the inner fibers, as it has been found that either or both features locates the line of greatest diameter of bulbing nearer to the structure than to the inner end of the bulbing protion 12. Also it is apparent that a rivet construction has been provided in which the male member breaks substantially flush with the head on the female member and with substantially the same contour so that finally the head on the female member seemingly has the appearance of the ordinary rivet head. In this construction, it is apparent that whether or not the male member breaks at this point may be considered a determining factor as to whether or not the head on the inner end of the female member is formed in a proper manner. Moreover, it is apparent that by having the male member break inwardly of the outer surface of the female member head the rivet may be employed for supporting various articles as described by threading for example the open end of the rivet head. Additionally, rivet constructions of the single bulbed head have been illustrated and described, in which particularly improved means are utilized for applying a greater stress to the outer fibers during the formation of the bulbed head from the portion 12 of the female member, for directing the stress at an angle to the rivet axis and for locking the male and female members together against relative axial movement. In general the invention constitutes a highly efficient rivet construction, which makes it possible to rivet a structure in an extremely strong, rapid and efficient manner from one side only of the structure. It will be appreciated that formation of the head on the inner end of the female member is a paramount problem, if the rivet assembly is to be inserted only from one side of the structure, and if the rivet is to have the necessary strength and is to be tight. The invention achieves this result in a highly satisfactory manner, as it has been determined that the rivet is extremely strong and that in fact parts of the structure riveted will fail prior to failure of the rivet.

Although various forms of the invention have been described and illustrated in detail, it should be apparent to those skilled in the art that various modifications may be made without departing from the scope of the appended claims.

I claim:

1. The method of riveting which comprises providing a tubular member, forming a reinforcing head on one end of the member and then applying axial forces through such head and in such manner as to stress the outer fibers of another part of the member to a greater extent than the inner fibers, and to bulb out said part.

2. The method of riveting which comprises providing a tubular member, forming a reinforcing head on one end of the member, and then applying forces to the end of such member through such head in a direction longitudinally of the member and at an angle to the axis thereof.

3. The method of riveting which comprises providing a tubular member, bulbing a portion of the member to form a reinforcing head, and then applying axial forces through such head to another part of the member to bulb the latter, and in such manner that the forces stress the outer fibers of such latter part more than the inner fibers at least adjacent the reinforcing head.

4. The method of riveting which comprises providing a tubular member, bulbing a portion of the member to form a reinforcing head, and then applying axial forces through such head to another part of the member to bulb the latter, and in such manner that the forces are directed longitudinally and slightly toward the axis of the member.

5. A rivet comprising a tubular member in which portions thereof have different resistances to outward expansion, and means including a member extending through the first member for stressing the outer fibers of the latter, to an extent greater than the inner fibers are stressed.

6. A rivet assembly comprising a tubular member having an end portion of reduced outer diameter, and a collar at the outer end of the latter, and a shank extending through the tubular member and having a head engaging the end face of the collar, said parts being so constructed and related that when the shank is pulled through the member in a direction to urge the head against the collar, the reduced portion of the member and a portion thereof adjacent thereto bulb outwardly in sequential order, and during bulbing of the latter portion, its outward fibers are stressed more than its inner fibers.

7. A rivet comprising a continuously annular tubular member having a portion adjacent one end of reduced wall thickness, the shoulder between such portion of reduced wall thickness and the remainder of the member being tapered with respect to the axis of the member.

8. A rivet comprising a continuously annular tubular member having a portion of reduced wall thickness, and an enlarged collar at the free end of the latter, one of the shoulders at the ends of such reduced portion, being tapered with respect to the rivet axis.

9. A rivet comprising a tubular member having a collar adjacent one end thereof which is of increased radial wall thickness with respect to a portion of the member adjacent thereto, said collar being less resistant to bending axially over such portion of the member of reduced wall thickness, than the latter portion is to outward bulbing, so that compressive forces applied to opposed ends of the member, first will bend the collar over, and then bulb the portion of the member adjacent thereto.

10. A rivet comprising a tubular member having axially distinct portions adapted to bulb sequentially in the rivet setting operation, one of said portions being defined by an axial portion having irregular wall thickness.

11. A rivet comprising a tubular member having axially distinct portions adapted to bulb sequentially in the rivet setting operation, one of said portions being defined by an axial portion having irregular wall thickness, said last portion having greatest wall thickness intermediate its ends.

12. A rivet comprising a tubular member having axially distinct portions adapted to bulb sequentially in the rivet setting operation, one of said portions being defined by an axial portion having irregular wall thickness, said last portion having greatest wall thickness intermediate its ends, and being progressively less thick toward the ends.

13. A rivet comprising a tubular member having annular, axially distinct portions for bulbing in sequential order upon application of compressive forces to the ends of the member, and means for effecting greater stress application to the outer fibers of the last bulbing portion, upon application of such compressive forces.

14. A rivet comprising a tubular member having annular, axially distinct portions for bulbing in sequential order upon application of compressive forces to the ends of the member, and means for effecting greater stress application to the outer fibers of the last bulbing portion, upon application of such compressive forces, said means comprising a tapered shoulder at one end of the portion to be bulbed first.

15. A rivet comprising a tubular member having annular, axially distinct portions for bulbing in sequential order upon application of compressive forces to the ends of the member, and means for effecting greater stress application to the outer fibers of the last bulbing portion, upon application of such compressive forces, said means comprising an enlarged sector of the portion to be bulbed first.

16. A rivet comprising a female member of tubular character having a head at one end provided with a threaded aperture, a male member having a head engaging the opposite end of the female member and a shank portion extending therethrough and through the threaded aperture, the shank portion of such male member terminating inwardly of the exposed end of the threaded opening in the head of the female member, whereby fastening devices may be secured in said threaded apertures.

17. The method of riveting which comprises providing a tubular member, applying forces to opposite ends of the member to bulb out a part of the member, and subsequently applying similar forces to bulb out a second part of the member.

18. The method of riveting which comprises providing a tubular member, and forming a pair of adjacent bulbed out head portions in one part of the member.

19. The method of riveting which comprises providing a tubular member with a continuously annular wall, and forming a pair of bulbed out head portions in adjacent parts of the member.

20. The method of riveting which comprises providing a tubular member with a head at one end and a tubular body portion, forming a head on the other end of the body portion to increase the bursting strength of such end, and then bulbing out a portion of the body intermediate its ends.

21. A rivet comprising a tubular female member having a part adapted to project through openings in a structure to be riveted, a part to be disposed at one side of the structure and to be bulbed into a head, and a part of reduced radial dimensions at the end of the second part, wherein the inner diameter of said first and second parts may vary approximately from 68 to 83 per cent of the outer diameter thereof, and the radial dimensions of the third part may vary approximately from 80 to 95 per cent of the radial dimensions of such first and second parts.

22. A rivet comprising a tubular member having a plurality of abutting bulbed portions of different axial dimensions.

23. A rivet comprising a tubular member having a plurality of bulbed portions at one end, said bulbed portions being adjacent and reinforcing one to the other in head formation.

24. A rivet comprising a tubular member having a plurality of abutting bulbed portions of different radial dimensions.

25. A rivet comprising a tubular member adapted to extend through openings in a structure and to project beyond one side of the structure, and expansible means inherent in the member at its projecting end and adapted to increase the bursting strength of the latter when axially compressive forces are applied to opposite ends of the member to bulb the projecting portion thereof.

26. The method of riveting which comprises providing a tubular member with a continuously annular wall, and forming a pair of bulbed out head portions in one part of the member in sequential order.

27. The method of riveting which comprises providing a tubular member, forming one part of the member into a bulbed out reinforcing head, and then applying forces in a direction generally axially of the member and through the reinforcing head, to bulb out a second portion thereof.

28. A rivet assembly comprising a tubular member having an end portion of reduced outer diameter, and a collar at the outer end of the latter, and a shank extending through the tubular member and having a head engaging the end face of the collar, said parts being so constructed and related that when the shank is pulled through the member in a direction to urge the head against the collar, the reduced portion of the member and a portion thereof adjacent thereto bulb outwardly in sequential order.

29. In combination, a tubular female member adapted to extend through structural openings and having portions adapted to project beyond both sides of the structure, a male rivet member extending through the female member and having a head on one end engaging one end of the female member, and a shank portion projecting beyond the other end of the female member, and means for effecting the formation of a plurality of adjacent heads on the female member between the structure and the male member head, when the projecting shank portion of the male member is pulled away from the end of the female member adjacent thereto, and the reactionary force or a substantially equal force is applied to such end of the female member.

30. A rivet comprising a tubular member in which integral adjacent portions thereof have different resistances to outward expansion, and means including a member extending through said tubular member and having a head portion for axially compressing said tubular member to expand said portions sequentially in the order of their differing resistances.

31. A rivet comprising a tubular means having a portion adapted to project through a structure to be riveted, a second portion adapted to project beyond one side of the structure and to be expanded by axial forces into a head and a third portion outwardly of the second portion and expansible by axial forces into a reinforcing head, a pin extending through the tubular means, and means on the end of the pin for applying axial forces to said second and third portions so as to expand them when the rivet is set.

32. A rivet comprising a pin adapted to project through a structure to be riveted and having a portion adapted to extend beyond said structure and to be expanded by axial forces into a head, means surrounding the pin adjacent the portion extending beyond said structure and expandible by axial forces, and means surrounding the pin outwardly of the first means and expansible by axial forces for reinforcing the first means when axial forces are applied.

LOUIS C. HUCK.